Feb. 6, 1923.

M. LUND.
HOG RING.
FILED MAR. 2, 1922.

1,443,996

Inventor
Morris Lund
By Lancaster and Allwine
Attorney

Patented Feb. 6, 1923.

1,443,996

UNITED STATES PATENT OFFICE.

MORRIS LUND, OF MONTEVIDEO, MINNESOTA.

HOG RING.

Application filed March 2, 1922. Serial No. 540,631.

*To all whom it may concern:*

Be it known that I, MORRIS LUND, a citizen of the United States, residing at Montevideo, in the county of Lac-qui-Parle and State of Minnesota, have invented certain new and useful Improvements in Hog Rings, of which the following is a specification.

This invention relates to animal nose rings and the primary object of the invention is to provide an improved ring which is so formed that the working back and forth of the ring in the animal's nose is prevented thereby effectively preventing the animal from rooting.

The animal nose rings now on the market are ineffective, in that they are round in cross section, presenting a smooth surface, which allows movement of the ring in the animal's nose without pain, after the hole made by the ring in the animal's nose has healed up. This permits the animal to root just as effectively as if the ring where not in place.

It is therefore another object of the invention to provide a novel nose ring for hogs having square edges providing cutting surfaces, which are adapted to bite into the animal's flesh when the ring comes into contact with the ground, so as to cause the animal pain when he starts rooting, thereby effectively preventing the animal from rooting.

A further object of the invention is to provide a nose ring having the inner surface thereof rounded to prevent cutting of the animal's flesh when the ring catches on a foreign object, thereby preventing the pulling or working out of the ring from the animal's nose.

A still further object of the invention is to provide a nose ring for hogs, which is formed of wire square shaped in cross section, to provide the cutting edges, which has its terminals scarfed or bevelled in opposite directions to provide penetrating points which are adapted to overlap to cause an endless ring in which the adhering of dead flesh intermediate the terminals of the ring is prevented.

With these and other objects in view, the invention consists in the novel construction, arrangement and formation of parts, as will be hereinafter more specifically described, claimed and illustrated in the accompanying drawings, forming a part of this specification, in which drawings:

Referring to the drawings in detail, wherein similar reference characters designate corresponding parts throughout the several views, the letter A indicates an improved ring; and B, a tool for applying the ring to an animal's nose.

Figure 1:
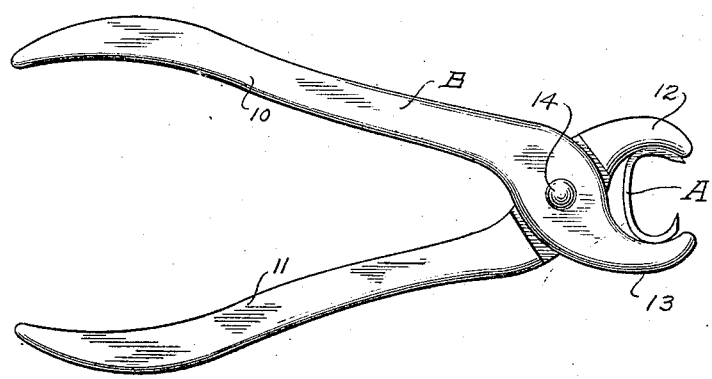
Figure 1 is a side elevation of the nose ring and a tool for applying the ring in place.

The tool B has merely been shown to illustrate how the ring is held during the application thereof to an animal's nose and the tool forms no part of the present invention, and this tool may consist of an ordinary pair of pliers or an ordinary nose ring applying tool. As shown, the tool B includes the operating handles 10 and 11 and the arcuate jaws 12 and 13 in which the ring A rests. The handles are of course, connected by a suitable pivot pin 14.

The ring A is preferably constructed from wire which is square shaped in cross section, but it is to be understood that any kind of wire may be used providing the same is polygonal shaped in cross section. If desired, the wire may be treated with copper or some other suitable non-rusting metal. Each ring consists of a body 15 and upturned ends 16 and 17. The upturned ends 16 and 17 are slightly inclined toward each other and the body 15 is of a substantially arcuate shape. As clearly shown in Figure 2 of the drawings, the arms or bent ends 16 and 17 are normally spaced from each other so as to permit the convenient application of the ring to the animal's nose, and the free ends of the terminals or arms 16 and 17 are scarfed or bevelled in opposite directions as at 19 and 20. This provides penetrating points 21 which are adapted to cut through the cartilage of the animal's nose. The scarfed or bevelled terminals 19 and 20 of the upturned ends or arms 16 and 17 also form guide surfaces for insuring the correct positioning of the arms in relation to one another or when the ring is applied to the nose of an animal.

Figures 2, 3, 4:
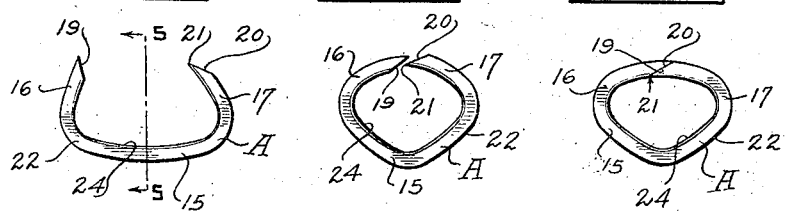
Figure 2 is an enlarged side elevation of the ring showing the shape thereof prior to being forced into the animal's nose.
Figure 3 is a similar view showing the ring partly closed.
Figure 4 is a similar view showing the ring in its fully closed position.
Figure 5:
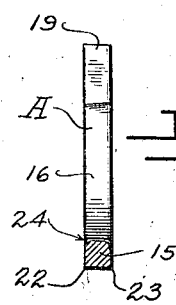
Figure 5 is a section through the improved ring, taken on the line 5—5 of Figure 2, illustrating the cross sectional configuration of the ring.

In Figure 3 of the drawings is shown the position of the ring when the same is in its partly closed position, and it can be seen that the body portion 15 intermediate its ends will bend, to permit the arms to be forced toward each other. Figure 4 of the drawings shows the ring when the same is in its fully closed position and it can be seen that the scarfed or bevelled terminals 19 and 20 will completely overlie each other and be in facial abutment and which will effectively prevent any dead flesh from lying between the same.

Inasmuch as the ring is formed from a strip of material which is square shaped in cross section, it is obvious that sharp cutting edges will be provided, which will, of course, cut into the animal's flesh when the ring comes into contact with the ground, which will effectively prevent the animal from rooting.

As clearly shown in the drawings, the wire being square shaped in cross section will provide outer cutting edges 22 and 23.

In order to prevent the working or pulling out of the ring from the animal's nose when the ring catches into any foreign object, it is desirable that the inner edges of the ring be rounded, as at 24, which will provide a smooth non-cutting surface.

Of course, the ring may be formed with all four of its edges disposed in angular relation to provide cutting surfaces, but in view of the fact that the inner edges, if left angular, provide cutting surfaces which would be apt to cut the animal's flesh and permit the working out of the ring when the ring catches on any foreign object, it is desirable to round these edges as described.

In applying the ring, the ring is merely placed between the jaws 12 and 13 of the tool B as clearly shown in Figure 1 of the drawings, and the penetrating points 21 are placed in engagement with the cartilage of the animal's nose, after which pressure is applied to the handles 10 and 11, which will effectively force the points through the animal's nose and completely close the ring as shown in Figure 4 of the drawings.

From the foregoing description, it can be seen that an improved nose ring for hogs has been provided of exceptionally simple and durable construction which will effectively prevent the hog from rooting at all times.

Changes in details may be made without departing from the spirit or scope of this invention; but,

I claim:

1. An animal's nose ring square shaped in cross section having sharp cutting outer edges and a smooth inner non-cutting surface.

2. A nose ring comprising an arcuate body, and inwardly extending arms, the terminals of the arms being bevelled in opposite directions to provide penetrating points and guide faces, the outer surface of the ring being provided with cutting edges, the inner surface of the ring being rounded to provide a non-cutting surface.

3. A nose ring for hogs comprising an endless ring polygonal shaped in cross section, the outer edges of the ring around the entire periphery thereof being provided with cutting edges, the inner periphery of the ring being rounded, as and for the purpose specified.

4. As a new article of manufacture, a hog nose ring comprising a body square shaped in cross section having its two inner edges rounded around the entire inner periphery of the body and its two outer edges sharpened around its entire outer periphery.

MORRIS LUND.